Sept. 2, 1969          D. M. BOYD          3,464,895
METHOD OF OPTIMIZING HEAT INPUT TO A FRACTIONATION COLUMN
Filed April 8, 1968
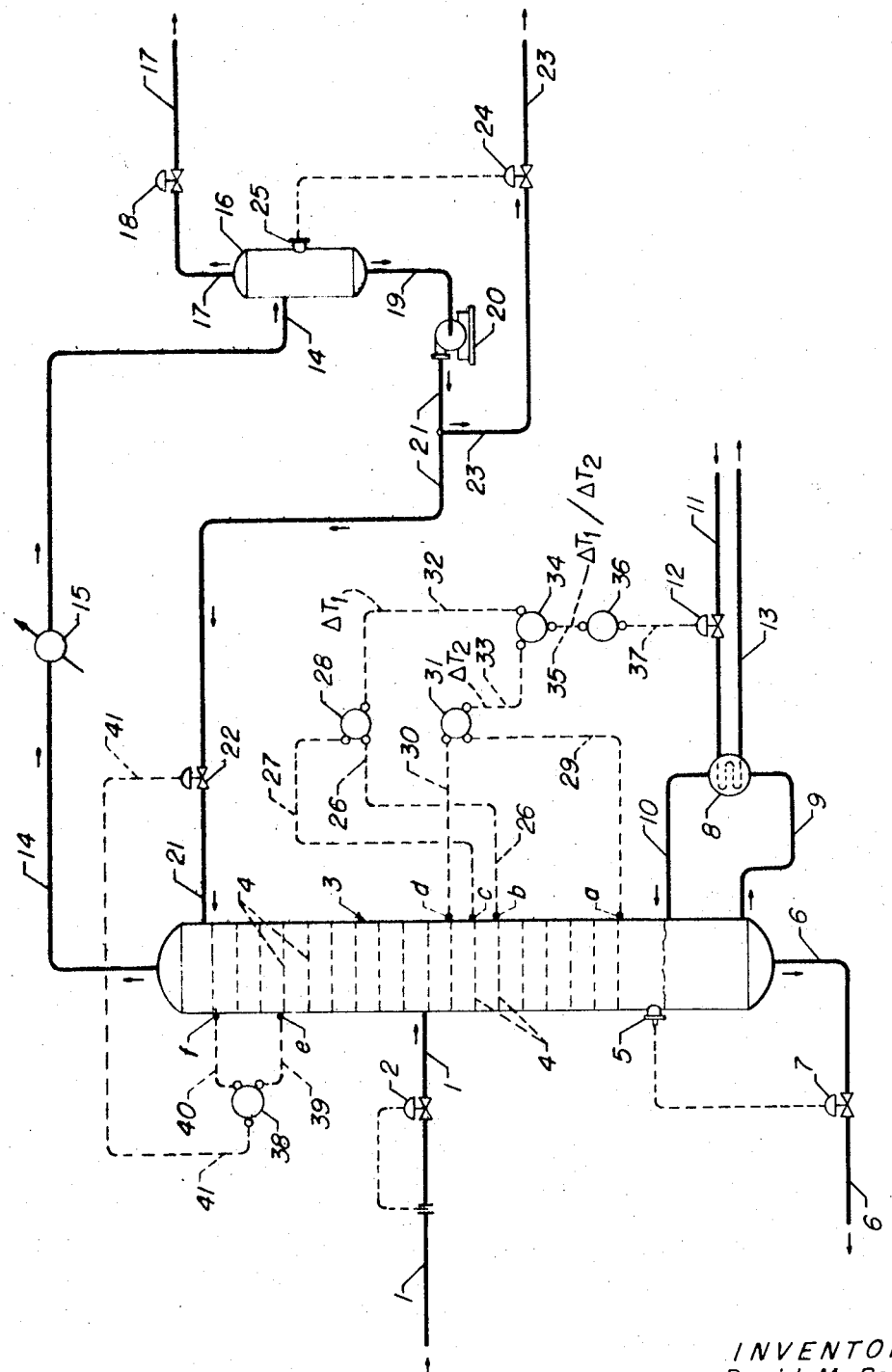
INVENTOR:
David M. Boyd
BY: *James R. Hoatson, Jr.*
*Philip T. Liggett*
ATTORNEYS United States Patent Office 3,464,895
Patented Sept. 2, 1969

3,464,895
METHOD OF OPTIMIZING HEAT INPUT TO A FRACTIONATION COLUMN
David M. Boyd, Clarendon Hills, Ill., assignor to Universal Oil Products Company, Des Plaines, Ill., a corporation of Delaware
Filed Apr. 8, 1968, Ser. No. 719,556
Int. Cl. B01d 3/42
U.S. Cl. 203—2    9 Claims

ABSTRACT OF THE DISCLOSURE

A method of controlling and optimizing heat input to a fractionation column using controlling and regulating means dependent upon a variable which is a function of temperature within the column, while the column is operating at different quantities and qualities of feed and held at a constant product quality by a separate conventional control means.

This invention relates to an improved method of optimizing heat consumption in the operation of a fractionating column using a control means dependent upon a temperature variable, where the quality or quantity of feed is varied while the product quality is held constant by a separate conventional control means. More specifically, the invention concerns automatic maintenance of optimum heat input using temperature indicating and heat control means connecting with the column below the feed point thereto.

In a usual fractionating operation, the mixed or multicomponent fluid stream is charged to approximately the mid-point of the column, which is a vertically disposed chamber having a plurality of spaced bubble trays or decks, or alternatively, a substantial depth of suitable packing material which will effect a desirable mixing of the countercurrently flowing liquid and vapor streams within the column. Heat is normally supplied to the column by means of a reboiler which connects with the lower portion of the column to a liquid reservoir maintained therein by means of a suitable level control means. Reflux is normally returned to the top of the column in a regulated quantity suitable to permit proper rectification within the upper portion of the column. This reflux regulation is called material balance control, and in present types of continuously operating fractionating columns, material balance control is usually effected using such conventional controls as a temperature controller, a differential temperature controller, a pressure compensated temperature controller, or an analytical type of controller such as a chomatograph. Such a suitable controlling device is connected to the interior of the column at the rectification section, and the quantity of reflux to the column is regulated by this controller in order to maintain produce quality.

A temperature controller regulates the quantity of reflux returned to the column according to changes in temperature at the point of measurement, while a differential temperature controller regulates according to changes in temperature differential between two points in the column. A pressure compensated temperature controller also regulates according to changes in temperature differential, but this device compensates for the effect which pressure variations have on the temperatures at the points of measurement. An analytical controller regulates the reflux rate according to some other heat dependent physical characteristic of the fluid being distilled, such as composition as analyzed by a chromatograph.

The material balance control devices heretofore mentioned are those most often used. They have in common the characteristic of directly regulating reflux flow in response to changes in internal conditions of the column. A controller which so operates is both necessary to and compatible with the present invention.

Heretofore, the magnitude of changes made in the heat supplied to the reboiler to achieve optimum heat consumption for a changing feed at a constant product quality has required extensive computations. These computations are usually accomplished through the use of a commercial electronic computer, which though quite expensive, has been the only method of making the computations in the time normally required. Other methods are generally too slow to be of any use. While the use of an electronic computer, and the adjustment of heat input to the reboiler according to its calculations, accomplishes the desired result, this is done only at the extremely high cost of maintaining access to such a computer.

It is the object of the present invention to optimize heat consumption in a fractionation column by effecting the proper changes in heat input to the column where the product quality remains constant and the feed stream changes either in relative percentage of the feed stream components, or in total feed stream flow rate. This is accomplished by controlling heat input to the column in proportion to a variable which changes when the quantity of reflux changes, but which has a susbtantially constant value for a given product quality. One such variable is the quotient of the temperature difference or gradient, between two proximate vertically spaced temperature indicating points below the feed level, divided by the temperature difference, or gradient, between two vertically spaced temperature indicating points below said feed level and bracketing by a substantial margin the two proximately spaced temperature indicating points. This can be formulized as:

$$\frac{T_b - T_c}{T_a - T_d}$$

where $T_b$ and $T_c$ are temperatures at the proximate vertically spaced temperature indicating point and $T_a$ and $T_d$ are the temperatures at the vertically spaced temperature indicating points bracketing the points at which $T_b$ and $T_c$ are measured. $T_c$ may or may not be measured at the same point as $T_d$, but in no case is $T_d$ measured at a point vertically lower than is $T_c \cdot T_a$ is always measured at a lower point than is $T_b$, which in turn is always measured at a point lower than is $T_c$. The exact location of the aforesaid points will vary slightly with the desired overhead product and the column construction, but a wide variance in such products or construction produces only a proportionally small variation in the optimum relative spacing of the vertically spaced temperature indicating points.

It is a further object of the present invention to optimize heat input to a column through means which are an integral part of the column itself, and which make external computations and subsequent adjustments unnecessary. A savings in both the time and expense heretofore required for making adjustment to heat input after a change in the feed stream will be realized. Time will be saved because extensive computations will no longer be required. Since there will no longer be a need for an expensive electronic computer to assist in determining the adjustments to be made, the expenses of adjustment will be reduced. In addition, there will be a saving in the fuel used to supply heat to the column since adjustment will be accomplished more rapidly, and the optimum heat input conditions will more consistently prevail.

In a broad aspect, my invention can be best described as providing in the fractionation of a mixed feed stream wherein at least overhead and bottom components are withdrawn at a constant product quality, the method of controlling and optimizing heat input to a column which comprises maintaining two temperature gradient indicating means, a first means measuring the gradient between two proximate vertically spaced temperature indicating points below the level of introducing said mixed feed stream to the column, and the other means measuring the gradient between two vertically spaced temperature indicating points below said feed level and bracketing by a substantial margin the two proximately spaced temperature indicating points, dividing the temperature gradient of the smaller vertical range by that of the larger vertical range, and regulating the heat input to said column in response to the resulting quotient.

Regulation or control of heat input to the column is effected by making changes in said heat input in opposition to and dependent upon the magnitude of changes in said resulting quotient. Thus, if the quantity of flow in a feed stream is increased, the material balance control device keeps the product quality constant by increasing the reflux. The increased quantity of reflux tends to decrease the quotient of the temperature differential previously described. If this quotient is decreased, the quantity of heat input at the bottom of the column must be increased. This increased heat input continues until the temperature quotient returns to the steady state point which is the same value at which it stood prior to the change in the feed stream, whereupon the rate of heat consumption is established at a higher rate than that previous to the feed stream increase. The converse is true for a decreased feed stream flow.

In a preferred operation of the present invention, automatically operating temperature or composition indicating and control means are used within the column and exteriorly thereof, such that automatic division of the temperature or composition gradients is continuously made, and the heat input to the column is controlled and continuously regulated. Continuous operation provides and maintains the necessary heat consumption of the column and results in improved efficiency of the column for separation of the desired components. The control means may be utilized to vary and control the heat input to the column in various ways. Preferably, the controller is connected with the means which supplies heat to the reboiler of the fractionating column in order to effect a change in the external heat supplied to the lower portion of the column. Alternatively, the controller may be connected to the flow control valve in the bottoms product line such that the quantity of bottoms product drawn off may be varied as required to retain internal heat within the column or expel internal heat from the column, said internal heat being contained in the bottoms product of the column.

While as encompassed in the preferred operation of the invention wherein regulation of the heat distribution is effected through the use of automatic control instruments, it is not intended to limit the invention and improved operation to the use of any particular types of instruments or controls. The temperature or composition indicating means and the differential measuring and indicating means may be any of the conventional types utilized in the fractionation tower equipment, and the output signals from such instruments may be used to effect a response in proportion to the quotient of such signals through electrical, hydraulic, pneumatic, or other means, as utilized by the common types of instruments designed for this purpose. Alternatively, temperature readings can be taken from the temperature indicating means, manual computations made, and manual adjustments made to the heat input of the column. In place of temperature indicating devices, various types of vapor pressure devices for indicating composition may be utilized.

Reference to the accompanying drawing and the following description and explanation thereof will serve to further clarify the operation of the present invention as well as point out additional features and advantages which may be derived therefrom.

The drawing shows diagrammatically a fractionating column utilizing automatic means for controlling heat input to the column in accordance with one embodiment of the invention.

Referring now to the drawing, there is shown a feed line 1, having a suitable flow control means 2, such that a mixed or multi-component feed stream may be introduced into the fractionating column 3 at an intermediate point. The column 3 is indicated as a vertically disposed column having a plurality of bubble decks or trays 4 at vertically spaced distances and in a quantity sufficient to provide fractionation and separation of the feed stream. A body of liquid is maintained within the lower portion of the column 3 by means of a level controller 5 which in turn regulates the rate of liquid withdrawn through the bottoms outlet line 6, by means of control valve 7. The heat input of the column is provided through a reboiler 8 which in turn is connected to the lower portion of the column by means of lines 9 and 10. Heat is supplied to reboiler 8 by means of steam or other hot fluid medium, the heating medium passing through line 11 with control valve 12 and being discharged through the outlet line 13.

The overhead product stream from the column 3 is withdrawn by way of line 14 and passed through a condenser 15 to a condensate receiver 16. Uncondensed vapors are vented through line 17 and control valve 18, while the resulting condensed product stream is withdrawn from the lower portion of the receiver 16 through line 19 and pump 20. A portion of the condensate is returned to the upper end of the column as reflux by passage through line 21 and a flow control valve 22, while the remaining portion of the liquid passes through line 23 and a flow control valve 24 to storage, or to other processing equipment. In this embodiment, temperature measuring devices $e$ and $f$ are vertically spaced near the top of the rectification section within the column. These temperature measuring devices $e$ and $f$ transmit their temperature readings over lines 39 and 40 respectively to differential temperature controller 38, which senses any changes in temperature difference between the temperature measuring devices $e$ and $f$. Differential temperature controller 38 transmits signals over line 41 to flow control valve 22, thereby increasing or decreasing the reflux through flow control valve 22 to the top of column 3.

A liquid level control 25 connecting with the receiver 16 serves to automatically control the operation of valve 24 in line 23, whereby the total withdrawal is regulated to maintain a level within receiver 16. In the present invention, two temperature devices $b$ and $c$ are placed at proximate vertically spaced points below the feed inlet to the column 3 and two temperature devices $a$ and $d$ are spaced at vertically spaced points below the feed level to the column and bracketing by a substantial margin the two proximate spaced points at which $b$ and $c$ are placed. Both of the temperature measuring devices $b$ and $c$ are connected through suitable lines or transmitting means 26 and 27 respectively to a differential temperature measuring and controlling device 28, the latter being suitable to measure, transmit, and indicate temperature differentials, or temperature gradients $\Delta T_1$. Likewise, the temperature measuring or sensitive devices $a$ and $d$ connect through suitable lines or transmitting means 29 and 30 respectively into a differential temperature measuring instrument 31, which is suitable to measure, transmit, and indicate temperature gradient $\Delta T_2$. The differential temperature transmitting devices 28 and 31 connect through suitable lines or transmitting means 32 and 33 respectively to a division relay instrument 34, which is in turn suitable to receive impulses corresponding to variations in temperature, or temperature gradient and divide the gradient of the smaller vertical range by that of the larger range, e.g., $\Delta T_1/\Delta T_2$. Division relay instrument 34 is connected through line 35 to control means 36, which makes adjustments to flow control valve 12 as may be required, responsive to the variations in the resulting quotient.

In the embodiment of the drawing, the control instrument 36 controls through a suitable line 37 the flow control valve 12 in line 11, so that the heating medium input to the reboiler 8 is adjusted in response to variations in the quotient of the temperature gradients, as measured and indicated through the temperature sensitive devices $a$, $b$, $c$ and $d$.

Where either the quantity of the entire feed stream increases, or the percentage of overhead component increases in its flow through line 1, certain changes occur while others must be made. Since in either case more overhead component is present, an increased amount of this component should be withdrawn through line 23. To preserve the percentage of purity in this product, the same product quality must be maintained as existed prior to the feed stream change. Thus, along with the increased overhead product being boiled off from column 3 through line 14, and ultimately through line 23, a proportionally increased quantity of reflux product must be boiled off from column 3 through line 14 and ultimately returned to column 3 through line 21. This increased reflux is initiated and controlled by differential temperature controller 38 which operates upon sensing a decrease in the temperature difference between temperature measuring devices $e$ and $f$. Up to the time of increased reflux, the changes in the feed stream have a negligible effect on the temperatures at $a$, $b$, $c$, and $d$. With the increase in reflux, however, the temperature difference $\Delta T_1$ between temperature measuring devices $b$ and $c$ undergoes a drastic decrease, said decrease being disproportionally greater than the temperature decrease $\Delta T_2$ between temperature measuring devices $a$ and $d$, the result being a sharp decrease in the temperature variable $\Delta T_1/\Delta T_2$. The decrease in this temperature variable results in signals to control means 36, which increase the heat input from line 11 through control valve 12 to reboiler 8. As the heat in the column is increased, temperatures at $a$, $b$, $c$, and $d$ change to values such that the temperature variable $\Delta T_1/\Delta T_2$ resumes approximately the same value at which it stood prior to the change in the feed stream. At this point, the rate of heat consumption will be in equilibrium at a new rate greater than the prior rate of consumption.

When either the quantity of the entire feed stream decreases, or the percentage of overhead component decreases in its flow through line 1, the opposite effect results. The temperature difference between temperature measuring devices $e$ and $f$ increases, which results in a decrease of reflux. The decreased reflux causes the temperature variable $\Delta T_1/\Delta T_2$ to increase thereby causing control instrument 36 to decrease the heat input to column 3 by reducing the heat flow through control valve 12. When this occurs, eventually the reduced heat in the column will result in the temperature variable $\Delta T_1/\Delta T_2$ returning to the value at which it stood prior to the change in the feed stream, whereupon the rate of heat consumption will be in equilibrium at a new rate which is lower than the prior rate of heat consumption.

The following example will further illustrate this invention.

Example I

The fluid to be the overhead feed stream component in the fractionation was benzene, which was fed into a fractionating column having 48 bubble trays numbered from top to bottom with the feed stream entering the column at the level of tray 24. $T_a$ was the temperature at the level of tray 40, and $T_b$ was the temperature measured at tray 28. $T_c$ and $T_d$ were measured at the same point, which was at tray 25, which is the level of the tray directly below the tray level at which the mixed feed stream is introduced to the column. $T_e$ was the temperature measured at tray 8 and $T_f$ was the temperature measured at tray 3, and a temperature differential controller was used to regulate reflux, while maintaining constant a predetermined product quality. The feed stream was varied from a 42% benzene composition with a total flow rate of 2800 mols per hour to a 20% benzene composition at a total flow rate of 1600 mols per hour. This transition was carried out at a product quality, or ratio of reflux to feed, of 1.10:1. At the same product quality, in all cases the temperature variable resumed a value after the transition very close to the value which it had before the transition, once the system was brought to its new equilibrium conditions. A controller operating on this principle would reduce the heat to the reboiler of the column, for the fractionation of the lower quantity and quality feed, to less than half that of the fractionation of the richer and larger feed.

Nothing herein is to be construed as limiting the present invention to any specific types of control instruments, as manual means or any of the suitable and customary types of electrical or pneumatic control instruments that provide regulation and control in accordance with the quotient of the temperature differentials, may be used within the scope of this invention. Neither is the division relay means or instrument to be considered limited as any such means which transmit a signal in response to a quotient as heretofore described, will suffice. This invention is also adaptable to manual control and regulation. Further, it is not intended to limit the spacing or the positioning of the temperature or composition sensitive devices for controlling the heat input, other than that the smaller differential is measured at points bracketed by the points at which the largest differential is measured, and that all points are below the feed level. This spacing will vary in accordance with the size of the column, as well as in accordance with the overhead feed system component being fractionated therein. The material balance controller may be of any of the types described heretofore or of any other type which is capable of maintaining a substantially constant product quality for a varying feed stream by directly regulating the reflux returned to the column.

I claim as my invention:

1. In the fractionation of a mixed feed stream utilizing a fractionating column wherein said feed stream is introduced to the column at a locus intermediate the top and bottom thereof and at least overhead and bottom components are withdrawn from the column and a portion of said overhead component is returned to the column as reflux, the method of controlling and optimizing heat input to said column while maintaining a predetermined overhead product quality, which method comprises:

(1) sensing a first temperature gradient between two proximate vertically spaced temperature sensing points below the level of introducing said mixed feed stream to the column;

(2) sensing a second temperature gradient between two vertically spaced temperature sensing points below said feed level and bracketing by a substantial margin the two proximately spaced temperature sensing points;

(3) dividing the temperature gradient of the smaller vertical range by that of the larger vertical range;

(4) regulating the heat input to said column in response to the resulting quotient;

(5) sensing a variable in the rectification section of the column which is directly indicative of the overhead product quality and which is affected by a change in feed rate or feed composition; and (6) independently of said first and second temperature gradients, regulating the rate of reflux to said column responsive to said sensed variable.

2. The method of claim 1 further characterized in that the uppermost of the two proximate vertically spaced temperature sensing points is the same point as the uppermost of the other two vertically spaced temperature sensing points.

3. The method of claim 2 further characterized in that the uppermost vertically spaced temperature sensing point is located at the level of the tray directly below the tray level at which the mixed feed stream is introduced to the column.

4. The method of claim 1 further characterized in that said regulation of the heat input to said column is effected by making changes in said heat input in opposition to and dependent upon the magnitude of changes in said resulting quotient.

5. The method of claim 4 further characterized in that making changes in said heat input further comprises controlling the heat input to the reboiler of said column.

6. The method of claim 1 further characterized in that the sensed variable of step (5) is temperature.

7. The method of claim 1 further characterized in that the sensed variable of step (5) is pressure compensated temperature.

8. The method of claim 1 further characterized in that the sensed variable of step (5) is differential temperature between two vertically spaced points in said rectification section.

9. The method of claim 1 further characterized in that the sensed variable of step (5) is distillate composition as analyzed by a chromatograph.

References Cited

UNITED STATES PATENTS

| | | | |
|---|---|---|---|
| 2,580,651 | 1/1952 | Boyd | 203—2 |
| 2,684,326 | 7/1954 | Boyd | 203—2 |
| 2,965,549 | 12/1960 | Hudkins | 203—2 |
| 2,994,643 | 8/1961 | Smalling | 203—2 |

WILBUR L. BASCOMB, JR., Primary Examiner

U.S. Cl. X.R.

196—132; 202—206, 160; 203—3